Jan. 15, 1935.  D. I. REITER  1,988,332
ONE-PIECE STUD
Filed May 22, 1934
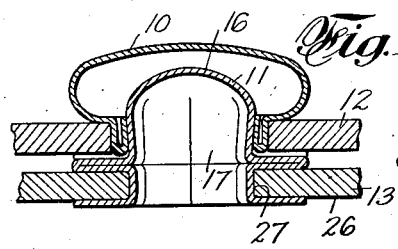
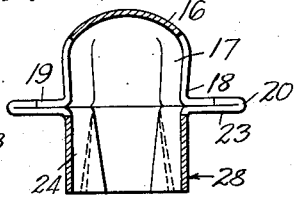
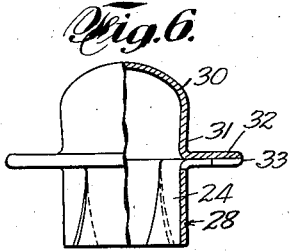
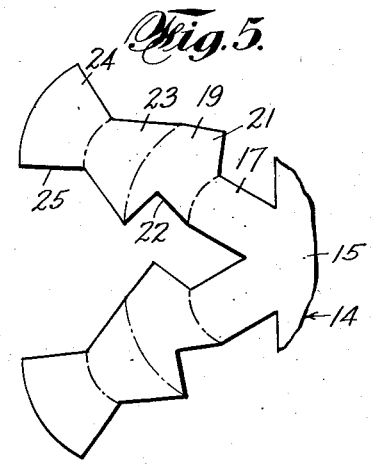
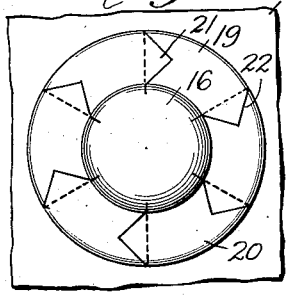
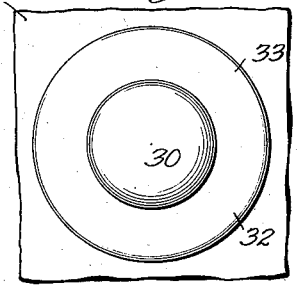
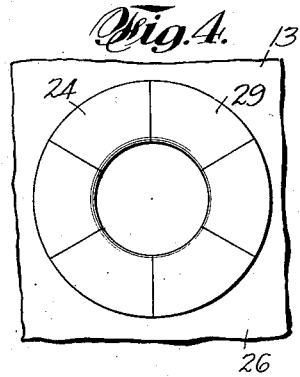
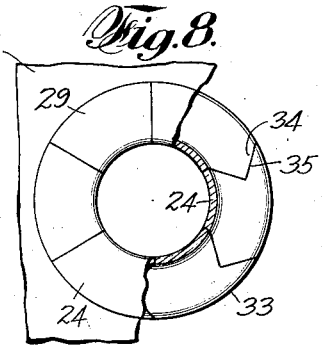
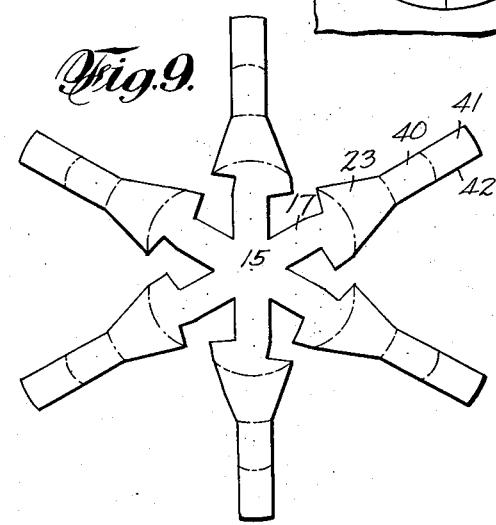
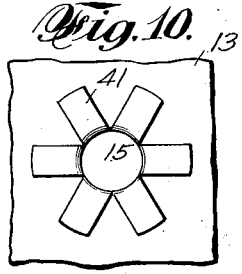
INVENTOR
DANIEL I. REITER
BY
Harry Jacobson
ATTORNEY Patented Jan. 15, 1935

1,988,332

UNITED STATES PATENT OFFICE 1,988,332

ONE-PIECE STUD

Daniel I. Reiter, New York, N. Y.

Application May 22, 1934, Serial No. 726,926

15 Claims. (Cl. 24—219)

This application being a division in part of my co-pending application for patent for One-piece stud and socket, Serial No. 680,969, filed July 18th, 1933, and as to the remainder being a division of my co-pending application for patent for One-piece stud and socket, Serial No. 699,716, filed November 22, 1933.

This invention relates to one-piece snap fasteners and particularly, to one-piece studs designed to be used in connection with any suitable socket such as the one piece sockets disclosed in my co-pending applications for patents Serial No. 680,969 and Serial No. 699,716.

My invention contemplates the provision of a one piece stud adapted to be bent from a flat blank having radiating arms, the stud thus bent having an outstanding flange comprising interlocking flange portions self-reinforced against lateral distortion.

My invention further contemplates the provision of a simple, inexpensive one-piece stud adapted to be produced economically in large quantities.

My invention further contemplates the provision of a self-reinforcing tubular part on the stud which is not likely to become bent or distorted during the tumbling operation, or when tumbled in or fed from a hopper, or otherwise abnormally but moderately stressed.

My invention further contemplates the provision of separable elements arranged in the form of a tube on the lower part of the stud, which elements when bent outwardly, form the securing flange of the stud, and firmly grip the sheet of material to prevent the stud from being pulled through the hole in the sheet through which the tubular portion of the stud is inserted.

The various objects of my invention will be clear from the description which follows and from the drawing, in which, Fig. 1 is a vertical section of a snap fastener installation including the stud embodying my invention.

Fig. 2 is a vertical section of one form of my improved stud showing the overlapping sections in the lower tubular part of the stud and showing the locking members of the outstanding flange arranged on the upper part of the flange.

Fig. 3 is a top plan view of the same.

Fig. 4 is a bottom plan view of the same after the attaching flange has been bent outwardly on to a sheet of material.

Fig. 5 is a fragmentary view of the blank from which the stud of Figs. 2 to 4 is made.

Fig. 6 is a partial front elevation and partial vertical section of a modified form of my improved stud wherein the stud head and sides are unslitted, but in which the lower thickness of the material of the flange is formed of separate members and interlocked.

Fig. 7 is a top plan view of the same.

Fig. 8 is a fragmentary bottom plan view of the same.

Fig. 9 is a plan view of the blank from which a modified form of the stud may be made, and wherein the attaching flange is discontinuous as shown in Fig. 10.

Fig. 10 is a bottom plan view of a stud made from the blank in Fig. 9 showing the discontinuous flange.

In the practical embodiment of my invention which I have shown by way of example, and referring to Fig. 1, the one-piece socket element 10, for which may be substituted any well known socket element, operatively engages the one-piece stud element 11. The socket and stud are secured respectively to sheets of material 12 and 13. Said socket is provided with suitable resilient fingers or other suitable means adapted for snapping engagement and disengagement with the stud.

The stud 11 is bent from a one-piece flat blank such as is shown in Figs. 5 and 9, said blank having an imperforate central portion and arms radiating therefrom. Said stud is composed of integral members suitably shaped to perform their intended functions.

It will be understood that Fig. 5 represents a portion only of the blank from which the stud is formed, the remaining portions being similar to those shown and equi-angularly spaced. As shown, the blank 14 is designed to form the stud of Figs. 2 to 4, and is provided with an imperforate central portion 15 from which is drawn, pressed, stamped or otherwise formed the imperforate top forming the extreme upper part 16 of the stud head. The sides and neck of the stud are formed from the innermost parts 17 of the arms of the blank, said parts being suitably bent for that purpose into edge-adjacent relation, and being constricted at their lower ends to form the neck 18 of the stud. The next outermost parts 19 of the radiating arms of the blank form the uppermost thickness of the doubled flange 20 of the stud. Said parts 19 are provided with interlocking and corresponding projections and recesses. As shown, the projection 21 is made on one of the edges of the part 19, and the corresponding recess 22 is made on the other edge.

It will be understood, however, as pointed out in my co-pending application Serial No. 680,969, that the projections and recesses may be otherwise arranged so as to interlock with each other. For example, a pair of similar projections may be made on alternate arms of the blank, and a pair of corresponding recesses on the remaining alternate arms. The next adjacent portions 23, arranged outwardly of the portions 19 of the blank form the under thickness of the flange 20. The outermost portions 24 of the radiating arms of the blank form the lowermost tubular portion of the stud, the edges 25 of said portions being so arranged that when the portions 24 are turned on to the under face 26 of the sheet 13, said edges 25 are in contact or substantially in contact as shown in Figs. 4 and 8. Said portions 24 are arranged in the finished stud preferably in the overlapping positions shown in Figs. 2 and 6 in that form of my invention now being described.

It will be understood that studs of this type are sold to the user with the attaching flange arranged in the position of Figs. 2 and 6, that is, in the tubular form 28 shown, and that the user passes said tubular portion 28 through the opening 27 of the sheet 13 and then by means of a suitable tool, flanges said portion 24 outwardly on to the face 26 of the sheet and into the position shown in Figs. 4 and 8 to form the substantially closed annular attaching flange 29.

Since, however, the widths of the portions 24 are comparatively great and much larger than their respective proportional parts of the tubular wall forming the attaching flange of the stud, (in the case illustrated, one-sixth), at least the divergent extreme edge parts of the portions 24 overlap each other as is best seen in Figs. 2 and 6. Said portions 24 are preferably of greatest width at their outermost points and of least width at their innermost points. The overlapping operation may be performed in any suitable manner, as by first bending alternate segment carrying arms into their tube forming positions and then bending the remaining segment-carrying arms to a position outwardly thereof. Nevertheless, the tubular portion 28 of the stud is made of substantially the diameter of the hole or opening 27 in the sheet 13 so that said tubular portion may be passed through the hole preparatory to flanging over the portions 24 on to the under surface of the sheet.

In other words, the greatest width of the portion 24 is greater than the circumference of the tubular wall 28 divided by the number of flange forming arms. In the flanging operation, during which the portions 24 are bent outwardly, said portions are spread apart from their overlapping positions and assume the position shown in Fig. 4 wherein at least part of said portions are in contact and form a substantially complete annular flange 29.

In that form of my invention shown in Figs. 6, 7 and 8 inclusive, the head 30 of the stud, the neck 31 and the uppermost thickness 32 of the doubled flange 33 are unslitted, imperforate, and continuous, the central portion of the blank being made imperforate for that purpose, or of a continuous piece as distinguished from separate arms in a manner which will be obvious. The interlocking projections 34 and recesses 35 are here formed on the under thickness of the flange 33 instead of the upper thickness thereof. By making the head and the upper thickness of the stud flange imperforate, the stud becomes more resistant to the distorting action of use, of the tumbling operation, and of the operations necessitated in feeding the studs into setting position in a suitable setting machine.

In that form of my invention shown in Figs. 9 and 10, the head, neck and outstanding flange of the stud may be made in either of the forms hereinbefore described in connection with Figs. 2 to 8, but the terminal portions 40 and 41 of the blank are provided with parallel sides whereby the edges 42 of said portions become arranged in edge adjacent relation to form a tubular wall in which the segments do not overlap each other but are preferably in contact. On bending the portions 41 outwardly on to the under face of the sheet of material to form the attaching flange, said segments 41 become separated to some extent as is shown in Fig. 10.

It will be understood that the segments 41 of the blank shown in Fig. 9 are the only parts of the stud which become separated when the stud is secured in place; that the side portions 40 of the stud on the contrary have their edges preferably in contact to form an uninterrupted tube; that the lower parts of the doubled flange likewise have their edges in contact, that the upper parts of the flange likewise are in contact to form an uninterrupted and continuous wall when the blank is formed into its final shape and also, that the side portions constituting the neck part 18 of the stud also have their edges in contact to form a continuous head. The stud accordingly is formed from a one-piece blank and is bent to form integral parts, the edges of which are preferably in contact with each other, that in the case of the blank of Fig. 9 and the stud of Fig. 10, the bottom flange which is employed to secure the stud to the sheet 13 is discontinuous.

In any case, it will be noted that the sheet of material is clamped between the attaching flange and the double flange 20 or 33 of the stud to firmly secure the stud to the sheet.

It will be seen that I have provided a one-piece stud adapted to be made economically from a single flat blank and self-reinforced against distortion during the finishing and setting operations thereon, and adapted to be flanged to form an attaching flange not likely to tear out through the hole in the material through which they may be inserted and presenting a finished appearance when attached in place.

While I have shown and described certain specific embodiments of my invention, it will be understood that I do not intend to limit myself thereto but that I intend to claim my invention as broadly as may be permitted by the state of the prior art and the scope of the appended claims.

I claim:

1. A one piece stud bent from a flat blank to form a socket engaging head portion, a neck portion, flange portions and an attaching portion, and means including interlocking projections and recesses along the edges of the flange portions for locking together said flange portions.

2. A one piece stud bent from a flat blank to form a socket engaging head portion, and a neck portion, and having a flange of double thickness, said flange comprising a series of flange portions provided with projections and recesses, the projections being interlocked with said recesses for locking together said flange portions to make the flange resistant to lateral distortion, and an attaching portion below the flange.

3. A one piece stud bent from a flat blank to form a socket engaging head portion and a neck portion comprising a plurality of side portions having edges in contact with each other and a plurality of flange portions below the neck portion having edges in contact with each other, means including interlocking projections and recesses on said flange portions for locking said flange portions together, and an attaching portion below the flange portions.

4. A one piece stud made from a flat blank and bent to form integral parts including a dome-shaped head, separate side portions each having the edges thereof in contact with the adjacent edges of the adjacent side portions, a doubled flange below the head, the separate side portions forming the upper portion of said flange having interlocking projections and recesses, and a tubular portion depending from the flange and adapted to have the lowermost part thereof turned outwardly to form a second flange spaced from the doubled flange.

5. A one piece stud bent to form integral parts including a head, slitted sides having edges in contact with each other, a double flange, the edges of the sides forming the upper portion of said flange having interlocking projections and recesses, and another flange spaced from said double flange.

6. A one piece stud comprising a head, an annular flange below the head and comprising a series of portions provided at their edges with recesses and projections interlocked with each other and a tubular portion below the flange, the lower part of said tubular portion being adapted to be turned outwardly into parallelism with the flange.

7. A one piece stud comprising a head having an imperforate top portion, depending side portions bent with the adjacent edges thereof in contact to form an uninterrupted surface on the head, a doubled flange projecting outwardly from the lower end of the head and comprising portions forming continuations of said side portions, said flange portions being provided with substantially triangular projections and recesses on their adjacent edges for interlocking engagement.

8. A one piece stud bent from a flat sheet metal blank to form a head portion, a neck portion, a flange portion and an attaching portion, said portions comprising separate members each continuous throughout said portion, the flange-forming part of said members being provided with edge projections cooperating with adjacent edge recesses, the projection of one member being received in the recess of an adjacent member when said blank is bent to form said flange.

9. In a one piece snap fastener stud, a head terminating in a neck, a flange of double thickness continuous with the neck and projecting outwardly therefrom, and a tubular portion depending from the lower thickness of the flange and comprising a plurality of separate members, each of greater width at its lower end portion than the circumference of said tubular portion divided by the number of such members, whereby said lower portions of said members overlap each other, said lower portions when turned outwardly forming an annular attaching flange.

10. In a one piece stud, a head terminating in a neck, a flange of double thickness extending outwardly from the neck, at least one of the thicknesses of said flange comprising a plurality of separate members provided with interlocking edge projections and edge recesses, and a tubular portion below the flange comprising continuations of said separate members, said continuations being arranged to form a tube and said continuations overlapping each other.

11. In a one piece stud bent from a flat blank to form a head portion, a neck portion, a flange portion of double thickness and an attaching portion, at least one of the thicknesses of the flange portion and the attaching portion comprising separate members each continuous throughout said portions, said one thickness of the flange-forming portion of said members being provided with edge projections and with cooperating edge recesses, the projection of one member being adapted to enter the recess of an adjacent member when said blank is bent to form said flange, and the parts of said members forming the attaching portion being in overlapping relation to form a tube having more than one thickness of material.

12. A one piece stud comprising a head, an annular flange below the head and comprising a series of members provided at their edges with recesses and projections interlocked with each other, and a tubular portion below the flange, the lower part of said tubular portion comprising overlapping continuations of said members.

13. In a one piece stud provided with a head, a doubled flange below the head, and a tubular attaching portion depending from and of less diameter than the flange, said tubular portion comprising separable members each of least width at the point adjacent the flange and of greatest width at the extreme end thereof remote from said point, the end portions of said members overlapping the end portions of the adjacent members and said end portions when bent outwardly into parallelism with said flange forming a substantially complete annular attaching flange for securing the stud to a sheet.

14. In a one piece stud provided with a head and a neck, an outstanding flange of double thickness of material continuous with and of greater diameter than the neck, and a tubular portion continuous with and depending from the under thickness of the flange and of less diameter than that of the flange, said tubular portion comprising separate members tapering to the greatest width thereof in a direction away from the flange, the end portions of said members overlapping the end portions of the adjacent members, and said end portions when bent outwardly at right angles to the axis of the tubular portion forming a substantially complete annular attaching flange parallel to the first-mentioned flange to grip a sheet therebetween.

15. In a one piece stud provided with a head and a neck, a tubular attaching portion below the neck and comprising separate members each of least width at the end thereof nearest the neck and of greatest width at the end remote from the neck, the end portions of said members remote from the neck overlapping the corresponding end portions of the adjacent members and the end portions of said separate members when bent outwardly forming an attaching flange for securing the stud to a sheet.

DANIEL I. REITER.